March 10, 1936.  W. WARR  2,033,559
HOSE
Filed June 9, 1931
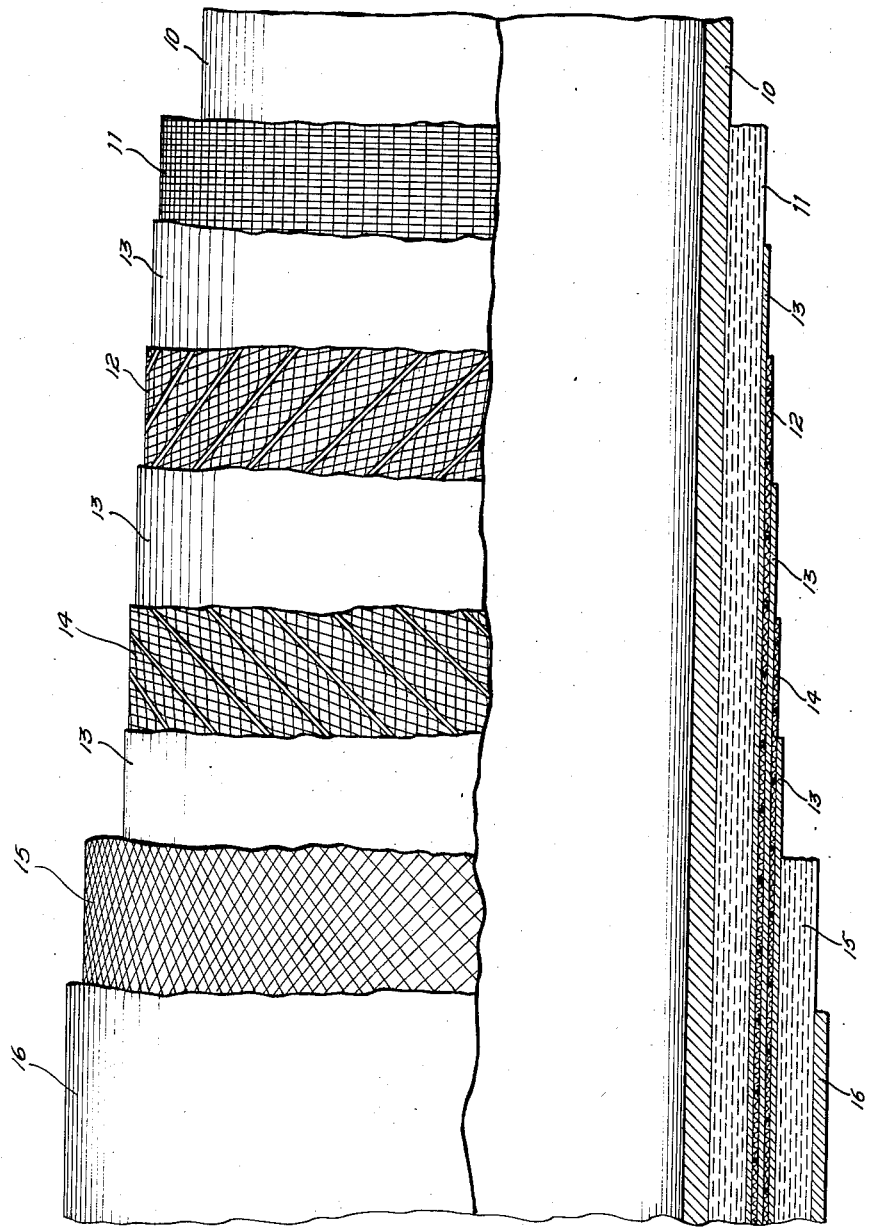
INVENTOR
WILLIAM WARR
BY  ATTORNEY Patented Mar. 10, 1936

2,033,559

UNITED STATES PATENT OFFICE 2,033,559

HOSE

William Warr, East Orange, N. J., assignor to Raybestos-Manhattan, Inc., Passaic, N. J., a corporation of New Jersey Application June 9, 1931, Serial No. 543,082

2 Claims. (Cl. 138—56)

This invention relates to a hose, and particularly to a pressure hose reinforced by metallic ribbons spirally wound upon or within the hose in a plurality of layers, the ribbons in one layer lying at a substantial angle to the ribbons in an adjacent layer, so that the spirals in said adjacent layers cross each other at frequent intervals, and the ribbons in each layer being securely anchored to the adjacent layers.

In a prior application of Arthur F. Townsend, No. 390,890, filed September 7, 1929, a hose is described in which an inner rubberized duck layer of the hose is reinforced by superposed supporting layers of spirally wound metallic ribbon, such as, for example, flat bead wire braid. In the hose therein described and claimed, the flat metallic ribbons of the superposed layers are positioned within the body of the hose so that they support the inner layers and prevent further stretching thereof before such inner layers reach their tensile limits. Such hose has proven to be far superior to all other types of hose for all uses where excessively high pressures are required.

Prior to my invention such hose has been made with rubberized fabric on both sides of and between the layers of metallic ribbon. I have now discovered, however, that if the superposed layers of metallic ribbons are embedded in a much thicker matrix of rubber than that which is extruded from the rubberized fabric, that the strength of the hose will be very materially increased and the shearing of the hose under high pressures will be substantially avoided, and that the intermediate layer of fabric can, with advantage, be omitted entirely.

I am unable at the present time to state with absolute certainty the reason for this improvement in performance when the hose is so constructed, but whatever its explanation, it is now demonstrated beyond any possibility of doubt that when the metallic ribbon is thus cushioned and embedded by a substantial thickness of high quality elastic rubber compound, which is vulcanized to the adjacent fabric layers, the resulting hose will effectually resist tremendous pressures, much higher than would have caused longitudinal shear in the best hose known before my invention.

In the accompanying drawing, I have shown a hose constructed according to my invention. The hose shown in the drawing comprises an inner tube 10 of impermeable and high tensile strength rubber composition. The second layer 11 is formed of frictioned duck wound over the inner layer 10. The rubber in this fabric layer 11 is sufficient to flow during the vulcanization treatment so as to form a substantially continuous matrix of rubber, which combines integrally with the inner rubber layer 10 and with the rubber in the interstices of and between the metallic ribbon layers 12 and 14. Over the fabric layer 11, but separated therefrom by a layer 13 of elastic rubber composition, is wound the metallic layer 12. In the preferred embodiment, this is made from a plurality of strips of flat bead wire braid wound side by side so as to follow relatively steep helices, e. g., approximately 45 degrees. This wire braid is preferably wound under sufficient tension to offer immediate support to the underlying fabric layer 11. Over this first metallic layer 12 is laid another similar layer 14 of metallic ribbon, wound in an opposite helix to the helix in the layer 12. As with the layer 12, the layer 14 should be separated both from the layer 12 and from the next outer layer by a substantial thickness of elastic rubber composition 13. This layer is wound under sufficient tension to press the rubber of the matrix 13 into the interstices of the braid. Over the braid layer 14 and the rubber 13, another layer 15 is formed by winding a fabric, e. g., frictioned duck similar to that used in the layer 11. In the preferred form, the fabric layer 11 is wound with its strongest thread substantially parallel to the axis of the hose, whereas in the layer 15, the duck is preferably cut on the bias, so that its threads run spirally about the hose and in this layer 15, the woof and the weft threads are preferably equally strong.

The rubber matrix 13 may be formed in any desired way as, e. g., by frictioning or extrusion onto the partially built-up hose or onto the metallic ribbon. The simplest way of forming the rubber matrix and the way which I now prefer is to wrap a layer of gum sheet over the fabric layer 11 before the metal ribbon is wound to form the layer 12 and similarly to place layers of gum sheet over the layers 12 and 14 respectively before the layers 14 and 15 are wound into place.

The positioning of the layers 12 and 14 within the hose is important in that there will be a limiting thickness of the layers 10 and 11, beyond which failure will occur on the interior before the support of the metallic layers becomes effective. Accordingly, the metallic layers should be placed sufficiently close to the center of the hose to prevent the stretching of any inner layer beyond its tensile limit. Within this limit, it is furthermore desirable to have the metallic layer quite close to the inner layer. Obviously, it is necessary that the innermost layer be one impervious to the fluid under pressure, but with such an inner layer, the metallic layer may be positioned next to the innermost layer. It has been found that an advantageous balance is secured in the hose if, for example, six plies of fabric are included in the layer 11 and six plies in the layer 15, or fewer plies may be included in the layer 11 and more in the layer 15.

Beyond the layer 15, other layers may be built up, for example, to resist abrasion or crushing, or other drastic conditions to which the hose may be subjected. Ordinarily I have found it preferable merely to add a layer of abrasion-resistant vulcanized rubber 16.

The hose built up as just described, after vulcanization includes an integral matrix of rubber extending from the inner surface of the hose through the interstices of the fabric and metallic layers to the outer surface of the layer 16. Furthermore, there is a cushion of substantial thickness between the layers 12 and 14, between the textile layers and the metallic layers. Such cushion, however, does not permit of radial compression, but only of circumferential stretching, since it is anchored to the wires of the braid and is substantially incapable of flowing between them. The rubber being incompressible, does not permit radial expansion of the layer 11 within the layer 12, any more than would result if the layer 12 were wound directly onto the layer 11 and similarly does not permit of radial expansion of the layer 12 within the layer 14, any more than if they were wound directly upon one another. On the contrary, I believe that the rubber layer serves to distribute the great pressure developed by the radial expansion of the inner layers evenly among the various wires of the wire braid and threads of the fabric and to anchor the wires to the fabric in a direction longitudinal of the hose, the more securely because of the great pressure transmitted uniformly between them by the rubber cushion layer. Thus the rubber cushion layer 13 may prevent slipping of the adjacent layers one upon another, as well as any injury which might result from direct contact of the wire with the fabric or the other wire layer, and thus the metallic layers may prevent rupture of the hose by longitudinal strain as well as by radial strain.

When the hose constructed as just described is subjected to pressure, it is placed under both radial and longitudinal stress. The radial stress tends to stretch the layers 10 and 11 into and against the metallic layers 12 and 14, whereas the longitudinal stress tends to stretch the hose longitudinally, and since the layers 12 and 14 are wound in opposite helices, the effect of this longitudinal stretching is an attenuation by the metallic layers 12 and 14 so that they are contracted against and consequently offer more immediate support to the inner layers 11 and 10.

Since, however, the pitch in this case is longer than would give an angle of 26° 33.3' to a plane normal to the hose, the theoretical angle to balance the combined radial and longitudinal stresses produced when the hose is under pressure, the fabric is supported by the wire windings a little more longitudinally than radially. Although it would seem contrary to what would be expected from theoretical considerations, I have found that in practice a hose thus constructed is more resistant to rupture than one in which the spiral windings are at a pitch corresponding to the theoretical angle of stress.

I have used the phrase "tensile limit" herein to describe the maximum tension to which a layer may be subjected without causing failure.

What I claim is:

1. A pressure hose comprising an inner impervious textile fabric layer adapted to confine the fluid under pressure and to distribute the effect of the pressure thereof uniformly at the outer surface of said fabric layer, a metal fabric layer of substantial thickness over said textile fabric layer composed of metal fabric ribbons helically wound thereon edge to edge and at an angle greater than 27° to a plane normal to the axis of the hose, a second metal fabric layer like the first, except that its ribbons are wound in opposite helices, a layer of textile fabric surrounding the metal fabric layers, formed so that its threads extend helically along the hose, and solid layers of soft rubber of substantial thickness between the metal fabric layers and between the textile fabric and the metal fabric adapted to distribute the pressure from the inner layers uniformly to the strands of the metal fabric layers.

2. A pressure hose comprising an inner impervious textile fabric layer formed so that its threads extend approximately longitudinally and circumferentially, adapted to confine the fluid under pressure and to distribute the effect of the pressure thereof uniformly at the outer surface of said fabric layer, a metal fabric layer of substantial thickness over said textile fabric layer composed of metal fabric ribbons helically wound thereon edge to edge and at an angle greater than 27° to a plane normal to the axis of the hose, a second metal fabric layer like the first, except that its ribbons are wound in opposite helices, a layer of textile fabric surrounding the metal fabric layers, and solid layers of soft rubber of substantial thickness between the metal fabric layers and between the textile fabric and the metal fabric adapted to distribute the pressure from the inner layers uniformly to the strands of the metal fabric layers.

WILLIAM WARR.